Sept. 16, 1969    P. REILLE    3,467,846
BRUSHES FOR ELECTRIC MOTORS
Filed April 18, 1966    2 Sheets-Sheet 1
Fig.1
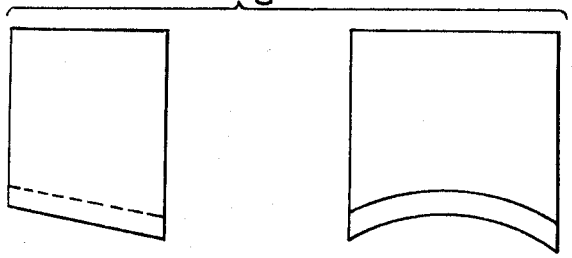
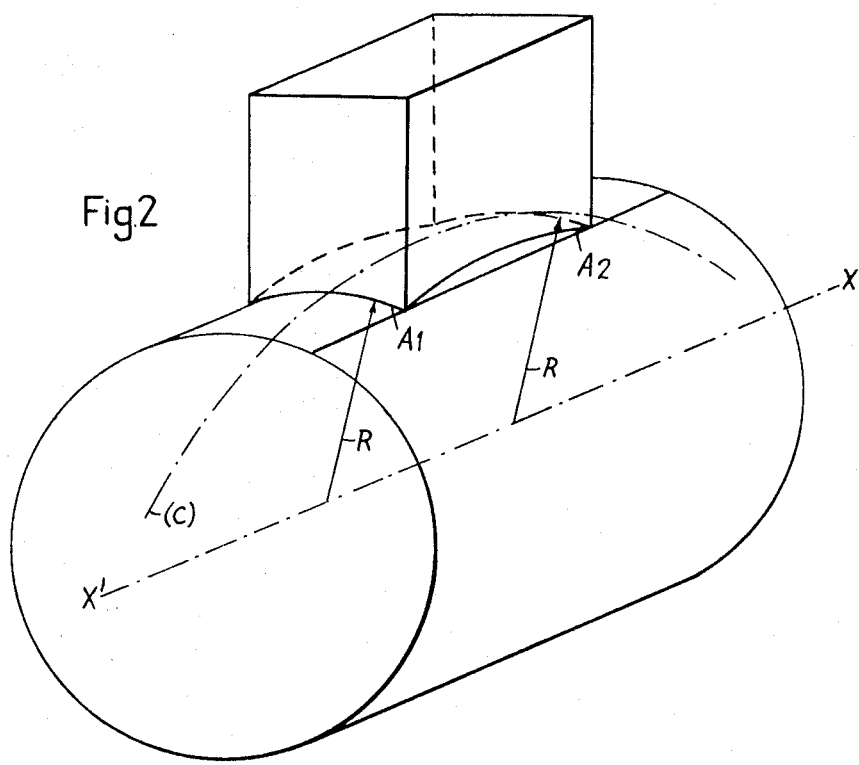
Fig.2
Fig.3
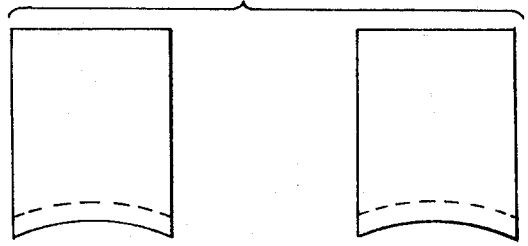
*Inventor*
*Paul Reille*
By
*Attorneys*

Sept. 16, 1969  P. REILLE  3,467,846
BRUSHES FOR ELECTRIC MOTORS
Filed April 18, 1966  2 Sheets-Sheet 2

Inventor
Paul Reille

United States Patent Office 3,467,846
Patented Sept. 16, 1969

3,467,846
BRUSHES FOR ELECTRIC MOTORS
Paul Reille, Neuilly, France, assignor to Societe Le Carbone-Lorraine, Paris, France, a French body corporate
Filed Apr. 18, 1966, Ser. No. 543,423
Claims priority, application France, May 5, 1965, 15,924; Mar. 11, 1966, 53,110
Int. Cl. H02k 13/10; H01r 39/18
U.S. Cl. 310—248
4 Claims

ABSTRACT OF THE DISCLOSURE

A brush for electric motors has a collector-rubbing face machined to a concave form of revolution. The axis of revolution of this form corresponds to that of the collector. This enables the brush to rest in stable manner from the first on the collector so that it is silent in operation and is rapidly stabilised during the period of wearing in. The brush may be square in section so that it can be mounted along either of its horizontal axes if the material is isotropic; in this case the concave form is spherical. The opposite face may also be of concave form.

The present invention relates to electric motor commutator brushes and in particular to a form of the face of the brushes rubbing on the collector, which improves their stability and accelerates their wearing in.

It is known that in so far as brushes do not rest upon all their tangential dimensions they are noisy and commutation is bad. These troublesome defects disappear when the brushes are perfectly worn in, but the period of wearing in can be long and onerous.

According to previous methods to diminish this period of wearing in, the surface of the brush in contact with the collector can be partially reduced, for example by chamfering the rubbing face. But this artifice presents the inconvenience of unbalancing the brush which can, in consequence, wear away askew.

It is an object of the present invention to provide a brush having an improved collector-rubbing face.

It is another object of the invention to provide an improved commutator for an electric motor. It is a further object of the invention to provide an improved electric motor.

Another object of the invention is to provide a method of forming an improved brush for an electric motor.

According to the invention an improved brush for electric motors comprises a collector-rubbing face machined to have a concave form of revolution, the axis of revolution of said form corresponding to that of the collector, whereby the brush rests in stable manner upon the collector by two circular edges so that the brush is rendered silent and the commutation is rapidly stabilised during the period of wearing in.

In order that the invention will be better understood several embodiments are described below by way of non-limiting examples, with reference to the accompanying drawings in which:

FIG. 1 represents the chamfered form of the rubbing face previously mentioned,

FIG. 2 represents a perspective view of a brush according to the invention,

FIG. 3 relates to brushes of square section.

Figure 4:
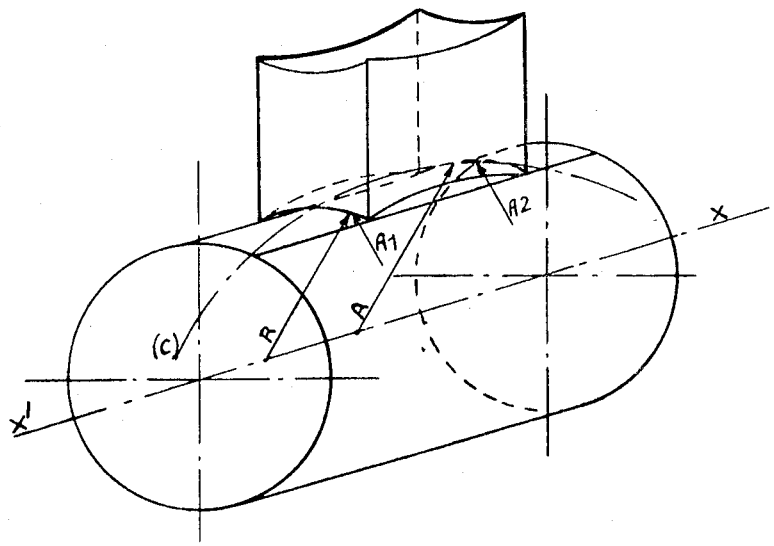
Figure 5:
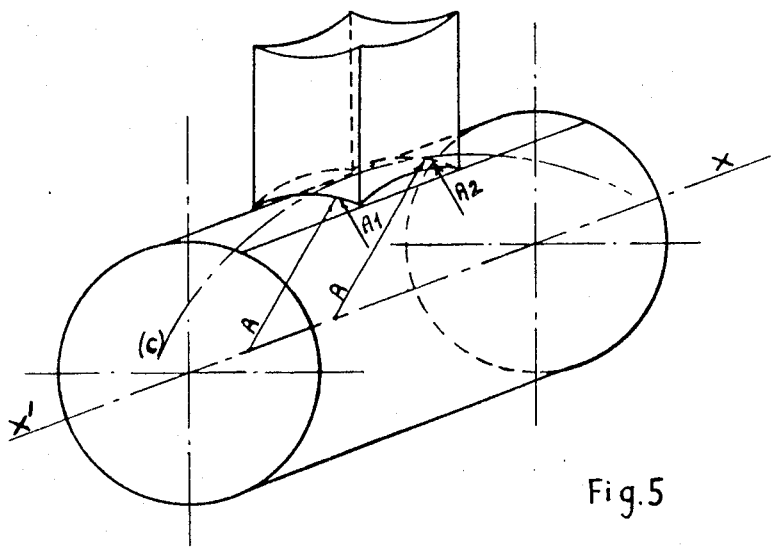

FIG. 4 shows a perspective view of another embodiment of a brush according to the invention, FIG. 5 shows a perspective view of a further embodiment of a brush according to the invention. Referring now to the drawings, the brush shown in FIG. 2 has a collector-rubbing face with a concave form of revolution of which the axis of revolution corresponds appreciably to the axis X—X of the collector.

The generative line C has its concavity oriented towards this axis. This curve is preferably symmetrical relative to the axial plane of the brush, perpendicular to the axis of the collector. Moreover, the radii of curvature of the edges A1 and A2 have appreciably the radius of the collector.

The new brushes are in contact with the collector through these edges, which assures them a complete transverse stability. These fine edges wear away very rapidly and the brushes rest thus immediately upon all their tangential dimensions, which resolves the problem of noise and of commutation, from the initial moment of use.

The surface of contact then passes progressively and without abrupt transition from the reduced surface to the total brush surface, as the contact surfaces wear away.

Another embodiment of the invention relates to brushes of square section as shown in FIG. 3. In this case, it is preferred that the concave surfaces be given a spherical cup form, the radii of curature of the four edges being appreciably equal to that of the collector. The brushes can thus be mounted in any direction, if the material used permits this. It is advantageous to shape not only the face normally rubbing on the collector but also the opposite face.

In this way a headless brush is obtained which is capable of being mounted at will in either direction.

This advantage applied particularly to brushes of square section. In this case, the concave surfaces have a spherical cup shape, the radii of curvature of the collector. When the two opposite faces are thus shaped, it doubles the possibilities of mounting the brush correctly.

In the embodiment of FIGURE 4 both the rubbing face upon the collector and the opposite face are shaped according to a concave form of revolution such that the radii of curvature of the two edges are substantially equal to that of the collector.

The embodiment of FIGURE 5 is a square brush in which the face rubbing upon the collector as well as the opposite face are shaped according to a spherical concave cap such that the four radii of curvature are substantially equal to that of the collector.

I claim:
1. An improved brush for electric motors, said brush comprising a collector-rubbing face machined to have a concave form generated by revolution of an arc, the axis of revolution of said arc corresponding to that of the collector, whereby the brush can rest in stable manner upon the collector by two circular edges so that the brush is rendered silent and the commutation is rapidly stabilised during the period of wearing in.

2. An improved brush as claimed in claim 1, wherein said brush has a square section and said concave form is a spherical cup such that the radii of curvature of the four edges are equal to that of the collector, whereby the brush can be mounted on the commutator in any direction.

3. An improved brush as claimed in claim 1, wherein the face opposite to the collector-rubbing face has a similar concave form of revolution.

4. An improved brush as claimed in claim 2, wherein the face opposite the collector-rubbing face has a similar concave form of revolution.

References Cited

UNITED STATES PATENTS

| | | | |
|---|---|---|---|
| 1,568,774 | 11/1926 | Scofield | 310—248 |
| 2,739,255 | 3/1956 | Shobert | 310—251 X |

MILTON O. HIRSHFIELD, Primary Examiner

D. F. DUGGAN, Assistant Examiner